US006432277B1

(12) United States Patent
Sievert et al.

(10) Patent No.: US 6,432,277 B1
(45) Date of Patent: Aug. 13, 2002

(54) METHOD FOR REDUCING METAL ION CONTENT IN A CHEMICAL COMPOUND WITH A DIPOLE MOMENT

(75) Inventors: Wolfgang Sievert, Wunstorf; Joachim Leifels, Gehrden, both of (DE)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/423,583

(22) PCT Filed: May 7, 1998

(86) PCT No.: PCT/EP98/02687
§ 371 (c)(1),
(2), (4) Date: Aug. 15, 2000

(87) PCT Pub. No.: WO98/51388
PCT Pub. Date: Nov. 19, 1998

(30) Foreign Application Priority Data

May 9, 1997 (DE) .......................................... 197 19 720

(51) Int. Cl.⁷ .............................. C07C 1/00; C07F 3/00
(52) U.S. Cl. ........................... 204/157.15; 204/157.43; 204/157.44; 204/157.6; 204/157.63
(58) Field of Search ....................... 204/157.15, 157.43, 204/157.44, 157.6, 157.63

(56) References Cited

U.S. PATENT DOCUMENTS

| 4,313,786 A | 2/1982 | Smith ........................... 159/22 |
| 4,313,798 A | 2/1982 | Myers, Jr. .................... 202/234 |
| 4,826,575 A | * 5/1989 | Karamian ................... 202/176 |

FOREIGN PATENT DOCUMENTS

| DE | 1777844 | 5/1960 |
| DE | XP-002078221 | of 1968 |

OTHER PUBLICATIONS

Derwent Abstract—98–194418–199818 (EP 834339, Apr. 8, 1998).
Derwent Abstract—94–342811/199443* (DE 4319498, Nov. 3, 1994.

* cited by examiner

*Primary Examiner*—Edna Wong
(74) *Attorney, Agent, or Firm*—Colleen Szuch

(57) ABSTRACT

Process for reducing the metal ion content in a chemical compound having a dipole moment or a mixture of two or more thereof to 1 ppb or less by distillation with supply of the energy required for vaporizing the chemical compound or the mixture of two or more thereof in the form of electromagnetic waves having a frequency in the range from 1 MHz to 50 Ghz.

13 Claims, No Drawings

METHOD FOR REDUCING METAL ION CONTENT IN A CHEMICAL COMPOUND WITH A DIPOLE MOMENT

The present invention relates to a process for reducing the metal ion content of chemical compounds having a dipole moment by distillation, wherein the energy required for this purpose is supplied in the form of electromagnetic waves.

The use of electromagnetic waves (microwaves) for supplying the energy required for chemical processes or for purification/extraction of specific compounds is known per se. An overview of microwave technology appears in *"Kirk-Othmer Encyclopedia of Chemical Technology"*. 4th edition, Vol. 16, page 672 et seq., John Wiley & Sons" and in an article by B. J. Seubert entitled *"Stofftrennung mit hochfrequenten Wechselströmen"* [*Separation of substances using high-frequency alternating currents*] in ELEKTRONIK 1968, Part 1, pages 9–12, the latter relating in particular to the requirements in terms of apparatus for the separation of substances using high-frequency alternating currents. U.S. Pat. No. 4,826,575 and U.S. Pat. No. 4,313,798 describe the use of this technology for the preparation of distilled water, here too particular attention being paid to the design of the apparatus used for this purpose.

DE-A 35 09 215 describes an apparatus for a combined mechanical-thermal solid-liquid separation of suspensions whose solvent fraction can be heated by alternating electromagnetic fields, owing to the dipole moment of the solvent. Details of the systems to be separated are not given in this publication.

U.S. Pat. No. 4,313,786 relates to a process and an apparatus for recovering organic solvents, starting from mixtures of solvents with polymers soluble therein. The separation of methylene chloride, acetone and water from the corresponding polymer/water systems is described there by way of example.

None of the prior art publications cited above relates to the use of an energy supply in the form of electromagnetic waves, as defined above, for reducing the metal ion content in chemical compounds having a dipole moment. The provision of such a process is of particular interest for the purification of chemical compounds which are suitable, inter alia, for use in the semiconductor industry, such as, for example, hydrofluoric acid. To date, mainly conventional distillation methods have been used for the purification of hydrofluoric acid. The heat transmission is likewise effected in a conventional manner by means of steam or other heating media which are separated from the corrosive hydrofluoric acid by plastics surfaces or plastic-metal composites. A purification process by means of ion exchangers from the company Athens is also known but is capable only to a limited extent of achieving the purities required for use in the semiconductor industry and moreover involves contamination of the chemicals to be purified with organic materials.

For the production of integrated circuits and memories in highly integrated technology, purities of the process chemicals of less than 1 and 0.1 ppb, respectively, with respect to the metal ion content are currently required. This makes it necessary to develop purification processes which ensure such purity of the end product. On the basis of the stated requirements for the freedom of the abovementioned process chemicals from metal ions, there is, for some very aggressive chemicals, a restriction for the materials which are suitable for such a purification plant. If, for example, hydrofluoric acid is considered, only PFA (a copolymer of perfluoroethylene and an alkyl ether), PTFE (polytetrafluoroethylene) or FEP (a fluorinated ethylene/propylene copolymer) are suitable as materials for a distillation plant, owing to the chemical and thermal resistance. However, these substances have an extremely low thermal conductivity so that the energy transmission through, for example, PFA heating coils into the currently used distillation apparatuses consisting of PFA is very small. In particular, it is difficult to distil aqueous systems, such as, for example, 50% strength hydrofluoric acid, in these apparatuses since said systems have a boiling point of about 120 C, resulting in a high energy consumption owing to the low thermal conductivity of PFA.

The object of the present invention is therefore primarily to provide a process for reducing the metal ion content in a chemical compound by distillation, which process permits economical distillation even under the abovementioned material restrictions with regard to the apparatus to be used. This is possible by supplying the energy required for vaporizing the chemical compound to be purified in the form of electromagnetic waves.

Accordingly, the present invention relates to a process for reducing the metal ion content in a chemical compound having a dipole moment or a mixture of two or more thereof to 1 ppb or less by distillation with supply of the energy required for vaporizing the chemical compound or the mixture of two or more thereof in the form of electromagnetic waves having a frequency in the range from 1 MHz to 50 GHz.

Preferably, the frequency of the incident electromagnetic waves is in the range from 100 MHz to 10 GHz and in particular in the range from 1 to 5 GHz.

The incident electromagnetic waves can be generated, for example, by a magnetron and passed into the substance to be vaporized. The electromagnetic waves are preferably introduced via waveguides. The energy can also be generated by known high-frequency (HF) generators, such as a Klystron or traveling-wave tubes. The emission takes place as a function of the wavelength by a transmitting aerial or by direct emission from the semiconductor. Further details regarding the supply of electromagnetic waves to be introduced appear in particular in the article by B. J. Seubert mentioned at the outset.

By means of the process according to the invention, it is possible in principle to purify all chemical compounds having a dipole moment or mixtures of two or more thereof which are vaporizable per se. Inorganic and organic acids, such as, for example, hydrochloric acid, hydrofluoric acid, sulfuric acid, nitric acid, formic acid, acetic acid and propionic acid, inorganic aqueous bases, such as, for example, an aqueous ammonia solution, organic solvents, such as acetone, methanol, ethanol, propanol and N-methylpyrrolidone, solvents which are used as diluents in photoresists and in photolithography, such as, for example, propylene glycol monoethyl ether acetate (PGMEA) and propylene glycol monoethyl ether (PGME), and nonaqueous etching media, i.e. inorganic gases, such as, for example, HCl and HF, which are dissolved in organic polar solvents, such as, for example, glycols and alcohols, and mixtures of two or more thereof, may be mentioned in particular.

The present process is furthermore suitable for separating substances which form an azeotropic mixture with water from an aqueous medium, the content of these substances being above their content in the azeotropic mixture with water. A hydrofluoric or hydrochloric acid, each of which has an HF or HCl content which is above the content of HF or HCl in the azeotropic mixture with water, such as, for example, 50% strength hydrofluoric acid or 37% strength hydrochloric acid, may be mentioned in particular.

The process according to the invention makes it possible to reduce the metal ion content in the abovementioned chemical compounds to 1 ppb or less, preferably 100 ppt or less and in particular to 1 ppt or less, the lower limit in each case being determined by the available accuracy of measurement, which is currently about 1 ppt.

In principle, all materials which are at least partly transparent to the incident electromagnetic waves may be used as apparatuses for carrying out the process according to the invention. Suitable materials are, for example, glasses (quartz glass, borosilicate glass) or plastics, such as, for example, polystyrene.

If it is intended to purify a chemical compound whose purity has to meet particularly high requirements and/or which have aggressive chemical properties such as, for example, acids, bases and solvents which are used in the production of integrated circuits or memories, the distillation vessel preferably wholly or partly comprises polyethylene (PE), polypropylene (PP), polyvinylidene fluoride (PVDF), a copolymer of ethylene and tetrafluoroethylene (ETFE), a copolymer of ethylene and chlorotrifluoroethylene (ECTFE), a copolymer of perfluoroethylene and an alkyl ether (PFA), polytetrafluoroethylene (PTFE) or a fluorinated ethylene/propylene copolymer (FEP). Particularly preferably, the apparatus used consists completely of the abovementioned materials, among these in turn PFA, PTFE and FEP being preferred.

In a further embodiment of the process according to the invention, the distillation vessel is enclosed by a jacket comprising an electrically conducting surface, the jacket having the electrically conducting surface preferably comprising steel, copper, aluminum, nickel, chromium or titanium, each particularly preferably provided with a silver or gold layer. Among these in turn, a jacket consisting of stainless steel which already has sufficient reflectivity is preferably used.

The distillation apparatus used for carrying out the process according to the invention corresponds to conventional distillation apparatuses in design and generally comprises a distillation vessel, a condenser, an apparatus for feeding in fresh substance and for removing the purified substance and, if required, one or more distillation columns. Preferably the distillation column, where present, particularly preferably the entire distillation apparatus, consists of the same material as the distillation vessel.

The orifices for feeding in fresh substance or for removing purified substance in the distillation vessel used are preferably smaller than half the wavelength of the incident electromagnetic waves. Tubular connections which lead, for example, to distillation columns and condensers are preferably mounted on these orifices. The tubular connections are particularly preferably firmly connected to the distillation vessel and consist of the same material as said vessel. If the distillation vessel is enclosed by an electrically conducting surface, this jacket preferably also includes the stated tubular connections. The jacket of the tubular connections preferably has a length which corresponds at least to the wavelength, particularly preferably at least to twice the wavelength, of the incident electromagnetic waves.

Furthermore, the present invention relates to the use of a process as defined above for the preparation of a chemical compound having a dipole moment and a metal ion content of 1 ppb or less, or of a mixture of two or more thereof, for use in the semiconductor industry, and the use of such a process for reducing the metal ion content in a chemical compound having a dipole moment or a mixture of two or more thereof to 1 ppb or less.

The process according to the invention may also be integrated into a plant for the production of semiconductors, a substance contaminated during such a production process, such as, for example, nitric acid, optionally as a mixture with hydrofluoric acid, being directly purified in this manner and recycled to the production process, in the case of nitric acid to the etching tank. Neutralization of the contaminated acid is dispensed with in this case.

The present invention is also illustrated below with reference to an embodiment.

EXAMPLE

Energy in the form of electromagnetic waves having a frequency of 2.43 GHz were supplied via waveguides to a rectangular, metallic container having a PFA still which is led to the outside via metal-encased PFA pipes for feeding in hydrofluoric acid and for removing the purified hydrofluoric acid, the purified hydrofluoric acid being fed via a column or a condenser. The PFA still had a volume of 15 l. A 50% strength hydrofluoric acid having a metal ion content of from 1 to 5 ppb was fed continuously to this plant and was purified by distillation, the hydrofluoric acid which condensed in the condenser after the purification by distillation likewise having an HF content of 50% by weight but a substantially reduced metal ion content of only from 0.01 to 0.5 ppb.

What is claimed is:

1. A process for reducing the metal ion content in a chemical compound having a dipole moment or in a mixture of two or more of such chemical compounds, said process comprising the step of:
   distilling said chemical compound having said metal ion content, wherein the chemical compound is selected from the group consisting of hydrochloric acid, hydrofluoric acid, sulfuric acid, nitric acid, acetic acid, an aqueous ammonia solution, acetone, methanol, ethanol, propanol, N-methylpyrrolidine, propylene glycol monoethyl ether acetate (PGMEA), propylene glycol monoethyl ether (PGME), nonaqueous etching media, and mixtures of two or more thereof, by providing energy comprising electromagnetic waves having a frequency in the range of from 1 MHz to 50 GHz for vaporizing the chemical compound, thus reducing said metal ion content in said chemical compound.

2. The process as claimed in claim 1, wherein the chemical compound is hydrofluoric acid, said hydrofluoric acid comprising an amount of HF greater than the amount of HF in the azeotropic mixture of HF and water.

3. The process as claimed in claim 1, wherein the frequency of the electromagnetic waves is in the range from 1 to 5 GHz.

4. The process as claimed in claim 1, wherein the electromagnetic waves are introduced via waveguides.

5. The process as claimed in claim 1, wherein a distillation vessel comprising polyethylene (PE), polypropylene (PP), polyvinylidene fluoride (PVDF), a copolymer of ethylene and tetrafluoroethylene (ETFE), a copolymer of ethylene and chlorotrifluoroethylene (ECTFE), a copolymer of perfluoroethylene and an alkyl ether (PFA), polytetrafluoroethylene (PTFE) or a fluorinated ethylene/propylene copolymer (FEP) is used.

6. The process as claimed in claim 5, wherein the distillation vessel is enclosed by a jacket having an electrically conducting surface, the jacket comprising a metal selected from the group consisting of steel, copper, aluminum, nickel, chromium and titanium.

7. The process as claimed in claim 6, wherein said jacket is further provided with a silver or gold layer.

8. The process as claimed in claim 1, wherein the metal ion content is reduced to 1 ppb or less.

9. The process as claimed in claim 8, wherein the metal ion content is reduced to 100 ppt or less.

10. The process as claimed in claim 1, wherein the chemical compound is hydrochloric acid, said hydrochloric acid comprising an amount of HCl greater than the amount of HCl in the azeotropic mixture of HCl and water.

11. A process for reducing the metal ion content in a chemical compound having a dipole moment or in a mixture of two or more of such chemical compounds, said process comprising the step of:

vaporizing said chemical compound having said metal ion content, wherein the chemical compound is selected from the group consisting of hydrochloric acid, hydrofluoric acid, sulfuric acid, nitric acid, acetic acid, an aqueous ammonia solution, acetone, methanol, ethanol, propanol, N-methylpyrrolidine, propylene glycol monoethyl ether acetate (PGMEA), propylene glycol monoethyl ether (PGME), nonaqueous etching media, and mixtures of two or more thereof, by exposing said compound to energy, thus reducing said metal ion content in said chemical compound said energy comprising electromagnetic waves having a frequency in the range of from 1 MHz to 50 GHz.

12. The process according to claim 11 wherein the metal ion content is reduced to 1 ppb or less.

13. The process according to claim 11 wherein said vaporized compound is condensed.

* * * * *